Feb. 17, 1970 R. E. MILFORD 3,496,342

CARD READER LOGIC

Filed Aug. 30, 1966 2 Sheets-Sheet 1

INVENTOR.
RICHARD E. MILFORD

CARD READER LOGIC

Filed Aug. 30, 1966 2 Sheets-Sheet 2

United States Patent Office
3,496,342
Patented Feb. 17, 1970

3,496,342
CARD READER LOGIC

Richard E. Milford, Phoenix, Ariz., assignor to General Electric Company, a corporation of New York
Filed Aug. 30, 1966, Ser. No. 576,002
Int. Cl. G06k 7/00; G01n 21/30
U.S. Cl. 235—61.11 10 Claims

ABSTRACT OF THE DISCLOSURE

A logic circuit develops timing pulses from timing signals having a frequency determined by the speed of movement of a punched card so that these timing pulses will be synchronized with data signals which are read from the punched card even when there is slippage between the card and the card moving mechanism. The timing signals and data signals are applied to an AND-gate which provides a signal to set a flip-flop and thereby store the data signals.

This invention relates to card reader logic and more particularly to logic circuits for controlling signals developed from a reading of punched holes in an information bearing medium.

In a high speed data processing system, information processed by the system is supplied from an external source. This external source may furnish information to the data processing system for suitable information bearing mediums such as punched cards. Such cards usually have holes selectively punched at any one of the intersections of a matrix of 80 vertical columns and 12 horizontal rows. These holes are usually rectangular in shape and may be closely spaced leaving between them a narrow web of card material.

Card readers are used for reading information punched into the cards and for converting the presence or absence of a hole into an electrical signal representing a binary 1 or a binary 0. Stacks of cards placed in a hopper of the card reader are rapidly moved one at a time from the hopper, past a sensing station where they are read, and then deposited in another stack.

In order that information read from a card may be synchronously transferred to a data processor, some system must be provided for generating a timing pulse for each column position of the card scanned. One such prior art system employs a sensor which triggers a generator to start the generation of timing pulses when the leading edge of the card reaches a given position in its travel through the card reader. Such a system insures that a first timing pulse occurs at the time that the first column of the card is in position to be read. Other timing pulses follow the first pulse at regular intervals so that a perfectly aligned card, moving at a predetermined speed, would have a column in position to be read each time a timing pulse occurs. Each timing pulse causes an information signal existing during the timing pulse to be transferred to the data processor. Card expansion or contraction due to moisture, deviations in the location of holes in the card and slippage between the card and the card moving mechanism may cause timing pulses to occur at times when holes in later columns of the cards are not at the sensing station. Prior art systems usually resynchronize the generator with later columns of the card a number of times as each card moves past the sensing station. This resynchronization requires a large amount of circuitry which is bulky and expensive to construct. Therefore, a need exists for simple logic circuitry which will cause a timing pulse to be developed each time information from a column of the card is available for transfer to the data processor.

The present invention alleviates the disadvantages of the prior art by utilizing the speed of movement of the card to provide timing signals which are synchronized with the movement of the card being read. The card being read pushes an endless belt past a sensing station which develops timing signals in accordance with the speed of movement of the belt. A novel system of card reader logic employs the timing signals developed from the belt to produce a series of timing pulses which are synchronized with the reading of the card. This system of logic also extends the duration of the information signal by storing the information signal in a storage means for a time substantially equal to the time the punched holes and the following web of a particular column appear before the sensing station.

Accordingly, it is an object of this invention to provide an improved system for reading punched holes in an information bearing medium.

Another object of this invention is to provide a novel system for extending the duration of a signal, representative of the information being read, beyond the time the punched hole representing the information exists at a sensing station.

Still another object of this invention is to provide timing signals which are accurately synchronized with the signals developed by the information bearing medium being read.

A further object of this invention is to provide an improved circuit which develops timing signal for use with a wide range of card reading speeds.

A still further object of this invention is to provide an improved timing circuit which does not require resynchronization during the reading of a punched card.

Another object of this invention is to provide timing signals which are synchronized with the signals developed by the information bearing medium being read even though there may be deviations in the location of the holes in the medium.

Still another object of this invention is to provide a system for detecting and warning of malfunction of the card feeding mechanism.

A further object of this invention is to provide a system for detecting and warning of malfunction of a sensing station.

Briefly, in accordance with one embodiment of the present invention, a new improved system is provided for accurately reading information from punched cards. These cards will be read correctly even though there may be some slippage between the card and the card moving mechanism. The logic circuitry disclosed extends the data signals generated by the reading of the punched holes in the cards beyond the time the holes are being sensed in order to provide sufficient time for simultaneity to occur between the data signals generated, representative of the information being read, and the timing signals. These functions are achieved by providing a novel combination of timing and signal storage means. The data signals, representative of the information being read during the time holes are present at a sensing station in a card reader, are stored in a storage means. These data signals are retained in the storage means for a time substantially equal to the time the punched holes and the following web of a particular column appear before a sensing station. In addition, the logic circuitry develops a data transfer signal from timing signals which are generated by a moving belt which is pushed past the sensing station by the card being read. Thus, the data transfer signals are synchronized with the reading of information from the card even when the speed of movement of the card varies.

Other objects and advantages of the present invention will be apparent from the following specification taken in connection with the accompanying drawings wherein.

The present invention relates to a system for reading coded information from punched cards and since it is believed to be unnecessary to describe the well-known details of these systems in order to completely describe the invention, block diagrams will be used when possible. However, even though known details will be illustrated, the basic description of the entire system will be presented to enable one skilled in the art to understand the environment in which the present invention is placed.

Figure 1:
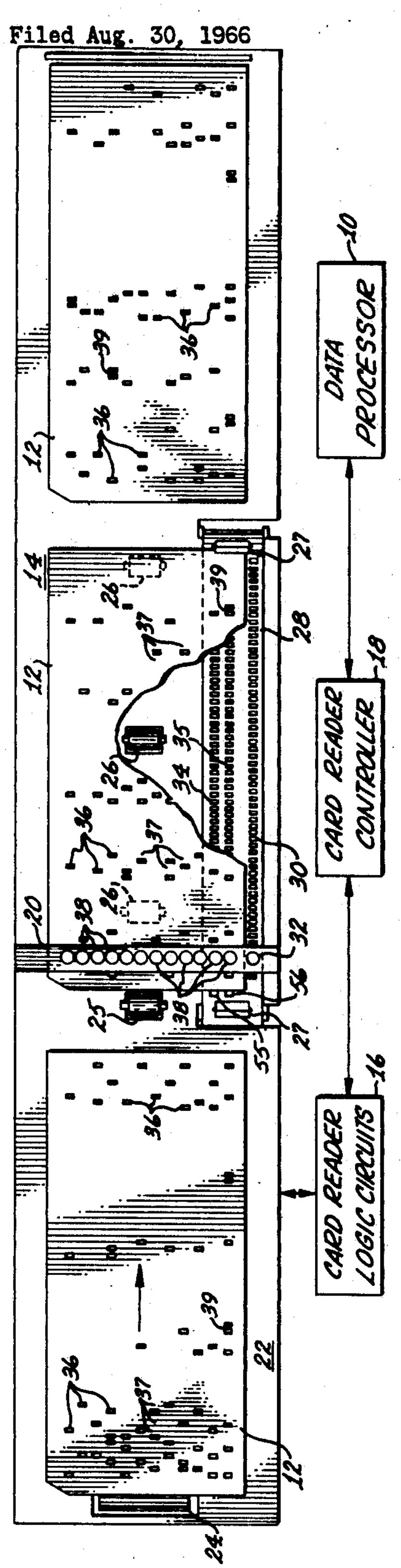
FIG. 1 is a block diagram of an information processing system embodying the present invention.

Referring more particularly to the drawings by characters of reference, FIG. 1 disclosed an information processing system wherein a data processor 10 receives signals representative of information read from a plurality of punched cards 12 by a serial card reader 14. The signals pass through card reader logic circuits 16 and a card reader controller 18 and are placed in the data processor 10.

Card reader 14 may be one of the known types and is illustrated schematically in FIG. 1 to show the relative positions of the various components of such a device. Cards 12 are moved past reading station 20 which may comprise sensing means including 13 photocells and a lamp. The lamp may be mounted below the card and the photocells which are masked by a plate having only a narrow slit below each photocell. The lamp (not shown), the slit and the centers of the photocells are vertically aligned.

As shown in FIG. 1, a card hopper 22 is arranged to hold a stack of cards to be read. A solenoid (not shown) is momentarily energized to selectively engage a single revolution clutch (not shown) for one complete revolution of operation, in response to which a picker knife edge 24 pushed the bottom card of the stack to a first roller 25. Roller 25 and a plurality of rollers 26 move the card past reading station 20. A motor drives the usual gear trains, linkages and pulleys (not shown) needed for moving the various parts of the card reader structure.

When a card 12 moves from hopper 22 toward the reading station, the leading edge of the card engages a tab 27 projecting outwardly from the surface of a lightweight endless belt 28 thereby causing belt 28 to move at the same rate card 12 is moving. Belt 28 has a row of equally spaced holes 30 which move past a sensing station such as timing photocell 32 to thereby develop a timing signal. This timing signal has a frequency which is directly proportional to the speed of movement of the card being read. Two other rows of holes 34 and 35 in belt 28 correspond to the holes which may be selectively punched at the intersections of the matrix of the vertical columns and the two lowest horizontal rows on card 12 and allow light from the lamp to go through these holes in the card to photocells 38. These holes in rows 34 and 35 allow the use of a standard width belt which overlaps a portion of the card being read. A belt which overlaps a portion of the card also permits the use of a tab 27 which engages a relatively wide portion of the leading edge of the card being read and thereby prevents bending the corner of the card. Rows 34 and 35 each have a larger hole, 56 and 57, near the trailing edge of the card being read to allow light to fall on photocells 38 so that the operation of these photocells and their associated circuitry can be checked when the end of each card passes the reading station 20.

Figures 2, 3:
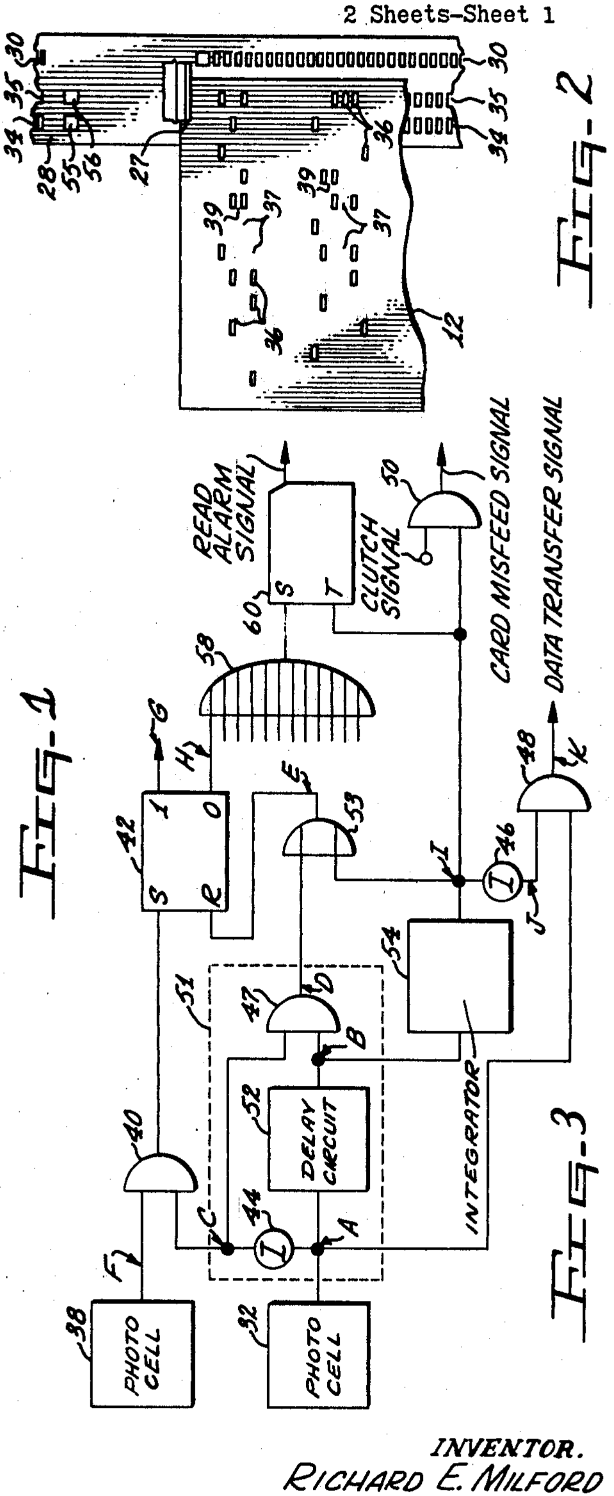
FIG. 2 is a partial view of a standard 80 column, 12 row punched card showing information punched on the card and illustrating the position of the card in relation to a movable belt.
FIG. 3 is a block diagram of the logic circuitry of the present invention.

FIG. 2 illustrates a partial view of the movable belt 28 and a standard 80 column, 12 row punched card 12 showing the recorded punched information, represented by rectangular impressions, at the intersections of the various rows and columns. The punched holes or rectangular impression 36 represent binary 1's and the blanks 37 (i.e., no punch impressions) at the intersection of the various rows and columns represent binary 0's. The webs 39 are thin portions of card material between adjacent holes in the card.

FIGURE 3 illustrates in block form the logic circuitry provided for implementing the synchronized timing and information extension features of the present invention. Although a card reader may have 13 identical photocells, one for developing a timing signal and 12 for reading the rows of the cards sequentially column by column, only two photocells are shown in FIG. 3 for the purpose of simplicity. Similarly, the logic circuit disclosed in FIG. 3 is provided for only one photocell for reading a row of the cards and similar circuitry including a photocell 38, a gate 40 and a flip-flop 42 must be employed for each of the other 11 rows of the cards, with the 0 output lead of each of these flip-flops being connected to a separate one of the input leads to gate 58.

A sensing means or photocell 38, shown in FIG. 3 is provided for reading the information punched in a given row of card 12 as it is moved column by column past the sensing station. At this same time, belt 28 moves the equally spaced holes 30 past a sensing station or photocell 32 to thereby develop a timing signal. When there is concurrence between the data signal generated by photocell 38 and the timing signal developed by photocell 32, the data signal developed by photocell 38 is transferred through AND-gate 40, and stored in a suitable buffering means such as flip-flop 42. Conditions for conjunction in AND-gate 40 are satisfied upon the simultaneous application of a positive output signal of photocell 38 and a similar signal from inverter 44. As used herein, buffering is intended to mean the ability of a facility such as a storage register or flip-flop to provide temporary storage of the binary digit being read by the card reader before transferring it, for example to the data processor. The flip-flop or bistable multivirbator described herein is a circuit adapted to operate in either one of two stable states and to transfer from the state from which it is operating to the other stable state upon the application of a set or a reset signal thereto. In one state of operation, the flip-flop represents a binary 1 (1-state) and in the other state the binary 0 (0-state).

The two leads entering the left-hand side of the flip-flop symbol shown in FIG. 3 provide the input signals. The upper lead, the set input lead, provides the set signal and the lower input lead, the reset input lead, provides the reset input signal. When the set input signal goes positive the flip-flop is transferred to its 1-state, if it is not already in the 1-state. When the reset input signal goes positive, the flip-flop is transferred to its 0-state, if it is not already in the 0-state. The two leads leaving the right-hand side of the flip-flop symbol deliver the two output signals. The upper output lead, the 1 output lead, delivers the 1 output signal of the flip-flop and the lower output lead, the 0 output lead, delivers the 0 output signal.

The inverter disclosed provides the logical operation of inversion for an input signal applied thereto. The inverter provides a positive output signal representing a binary 1 when the input signal applied thereto is negative, representing a binary 0. Conversely, the inverter provides an output signal representing a binary 0 when the input signal represents a binary 1. The symbols in FIG. 3 identified by the reference numerals 44 and 46 represent such inverters.

The AND-gates disclosed in FIG. 3 provide the logical operation of conjunction for binary 1 signals applied thereto. In the system disclosed, a binary 1 is represented by a positive signal, the AND-gate provides a positive output signal representing a binary 1 when, and only when all of the input signals applied thereto are positive and represent binary 1's. The symbol identified by numerals 40, 47, 48 and 50 in FIG. 3 represent AND-gates. Such AND-gates deliver a positive output signal only when both of the input signals applied thereto represent a binary 1.

A pulse generating means 51 including a delay circuit 52, inverter 44 and AND-gate 47 provides timing pulses for resetting flip-flop 42 immediately prior to the time that new information from each column of a card is stored in the flip-flop. These timing pulses are developed from the timing signal generated by photocell 32 when holes in the endless belt move past the photocell. A delay circuit 52 of the type which could be used in this invention is a delay line which is described on pages 99–101 and 103–104 of the text book, Digital Computer Fundamentals by Thomas C. Barkee, 1960, McGraw-Hill Book Company, New York, N.Y. The timing signal is delayed by delay circuit 52 so that the trailing edge of a positive signal from the delay circuit and the leading edge of an inverted signal from inverter 44 are simultaneously applied to the input leads of AND-gate 47. These signals cause gate 47 to provide a positive output pulse whose time duration is equal to the time delay provided by the delay circuit. This positive pulse transfers through an OR-gate 53 and is employed to reset flip-flop 42 prior to the time that new information is stored in flip-flop 42. One such positive pulse is provided for each column read on the card.

The OR-gates disclosed provide the logical operation of Inclusive-OR for positive input signals applied thereto. The OR-gate provides a positive output signal representing a binary 1 when any one or more of the input signals applied thereto represent binary 1's. When none of the input signals are positive, the OR-gate provides a negative output signal representing a binary 0. The symbols identified by numerals 53 and 58 in FIG. 3 represent OR-gates.

Timing signals from delay circuit 52 cause an AC coupled integrator 54 to develop an integrator output signal which reset flip-flop 42 at the end of each card. This integrator output signal also combines with other signals in the logic to provide a card misfeed signal if cards in the card reader should jam or fail to feed through the card reader at a predetermined rate of speed and to provide a read alarm signal if any of the photo cell circuits in the reading station should develop a defect. The integrator develops an integrator output signal having a first value or first voltage representing a binary 0, when a signal having a predetermined minimum frequency is applied to the input lead. When no signal is applied or when a signal having less than a predetermined minimum frequency is applied to the input lead of the integrator, the integrator develops a signal having a second value or second voltage representing a binary 1. Since the frequency of the signal applied to the integrator is determined by the speed of the holes 30 moving past photocell 32, the integrator provides a second voltage representing a binary 1 when no holes in belt 28 are moving past photocell 32. This binary 1 transfers through OR-gate 53 and resets flip-flop 42 when a card is not causing the timing belt to move past the reading station. When a moving card causes the first timing hole in belt 28 to move past photocell 32, the timing signal from the photocell causes integrator 54 to change to a first voltage and to remain at this first voltage as long as the timing holes move past photocell 32 at a predetermined minimum rate. When timing holes no longer move past photocell 32, the output of integrator 54 again becomes a second voltage representing a binary 1. An integrator of the type which could be used in this invention to provide a first voltage when holes in belt 28 are moving past photocell 32 and to provide a second voltage when no holes are moving past photocell 32 is shown on page 599 of the textbook, Radio Engineering by Frederick E. Terman, 3rd edition, 1947, McGraw-Hill Book Company, New York, N.Y.

The integrator output signal is applied to inverter 46 which develops an inverted integrator signal which is applied to AND-gate 48. This inverted integrator signal and the timing signal from sensing station 32 cause AND-gate 48 to develop a data transfer signal. The leading edges of this data transfer signal, shown at time $t_2$, $t_4$, etc., in waveform K of FIG. 4, can be applied to logic gates in a data processor (not shown). The output signal from flip-flop 42 shown in waveform G of FIG. 4 can also be applied to the same logic gates in the data processor so that the data transfer signal can be used to synchronize the transfer of data from flip-flop 42 to a data processor.

The present card reader logic compensates for deviation in the location of a hole in a card and for contraction or expansion of a card so that a hole can be positioned at any place that a hole and an adjacent web are normally positioned on the card and it will still be read by the card reader. This can be seen by an example shown in FIG. 4. The edges R and S of the holes shown in timing belt 28 respectively produce edges *r* and *s* of the signal in waveform C. The edges P and Q of hole 33 shown in punched card 12 respectively produce edges *p* and *q* of waveform F. If any positive portion of the signal in waveform F between edges *p* and *q* occurs at the same time as any positive portion of the signal to AND-gate 40 represent binary 1's so AND-gate 40 provides a positive output signal which causes flip-flop 42 to transfer to the 1-state. The flip-flop remains in the 1-state until it is reset by a timing pulse at time $t_3$ (waveforms E and K). The hole 33 (FIG. 4) can be moved so that edge Q is almost above edge R of the hole in timing belt 28 and the data which hole 33 represents would be stored in flip-flop 42 and would be transferred to the data processor at time $t_2$ of waveform K. Hole 33 can also be moved so that edge P is almost above edge S of the hole in timing belt 28 and the data which hole 33 represents would be stored in flip-flop 42 and transferred to the data processor at time $t_2$. Thus, the card reader logic of the present invention causes information represented by holes in a card to be transferred to a data processor at the proper time even when there is a wide deviation in the location of the holes placed in the card.

The present card reader logic provides a card misfeed signal if the card fails to feed through the card reader when the single revolution clutch causes the picker knife edge to attempt to feed a card past the reading station. When a card in the card reader jams or fails to feed, timing holes are no longer read by photocell 32 so that the output of the AC coupled integrator 54 will again be positive. This positive voltage from the integrator is applied to AND-gate 50 along with a clutch signal which is developed by a pickup coil (not shown) near the single revolution clutch of the card reader. This pickup coil develops the clutch signal whenever the clutch is rotating. When the positive voltage from the integrator and the clutch signal are simultaneously applied to the input leads of AND-gate 50, they cause the gate to provide a card misfeed signal at the output lead. This card misfeed signal can be employed to disengage the single revolution clutch of the card reader and prevent additional cards from being fed through the card reader.

In addition, the circuit shown in FIG. 3 checks all lamp, photocell and flip-flop circuits at the end of each card to be sure that these circuits are functioning properly. When the end of a card passes the reading station 20, the timing belt 28 prevents light from falling on timing photocell 32 so that a positive voltage is applied to each of the AND-gates 40 by inverter 44. At this time the card has passed the reading station 20 and holes 55 and 56 in rows 34 and 35 of the belt 28 allow light to fall on each of the photocells 38. Each of these photocells 38 should provide a positive voltage to set the corresponding flip-flop 42 and each flip-flop 42 should provide a binary 0 at the 0 output lead which is connected to an input lead of OR-gate 58. If light into any photocell is not sufficient or if any of the photocell or flip-flop circuits are not functioning properly so that any of the flip-flops associated with the 12 photocells 38 do not provide a binary 0 to the input of OR-gate 58, the output of OR-gate 58 represents a binary 1. When this binary 1 is applied to the set terminal of the monostable multivibrator 60 at the time that a rising edge or trigger voltage from integrator 54 is applied to the trigger terminal of the monostable multivibrator 60, the multivibrator produces a read alarm signal. Monostable multivibrator 60 is a circuit that operates in one stable state and one unstable state. In its set or unstable state, the monostable multivibrator represents the binary 1 (1-state) and in the reset or stable state, the binary 0 (0-state). The lead entering the left-hand side of the monostable multivibrator symbol shown in FIG. 3 provides the set input signal. When the set input signal is positive immediately prior to the application of a trigger pulse or when the set input signal is positive at the time of the application of a trigger pulse, the monostable multivibrator is transferred to its 1-state upon the application of a positive trigger pulse to its T input terminal. It will stay in this set state for a predetermined period of time depending on the time delay rating of the multivibrator and will then automatically return to its stable state (i.e., its reset state). Because the monostable multivibrator returns by itself to its reset state, no reset input is required. During the time that monostable multivibrator 60 is in its unstable state, a read alarm signal is provided at the lead on the right-hand side of the monostable multivibrator symbol shown in FIG. 3. The read alarm signal can be employed to disengage the single revolution clutch on the card reader so that cards will not be fed through the card reader.

Figure 4:
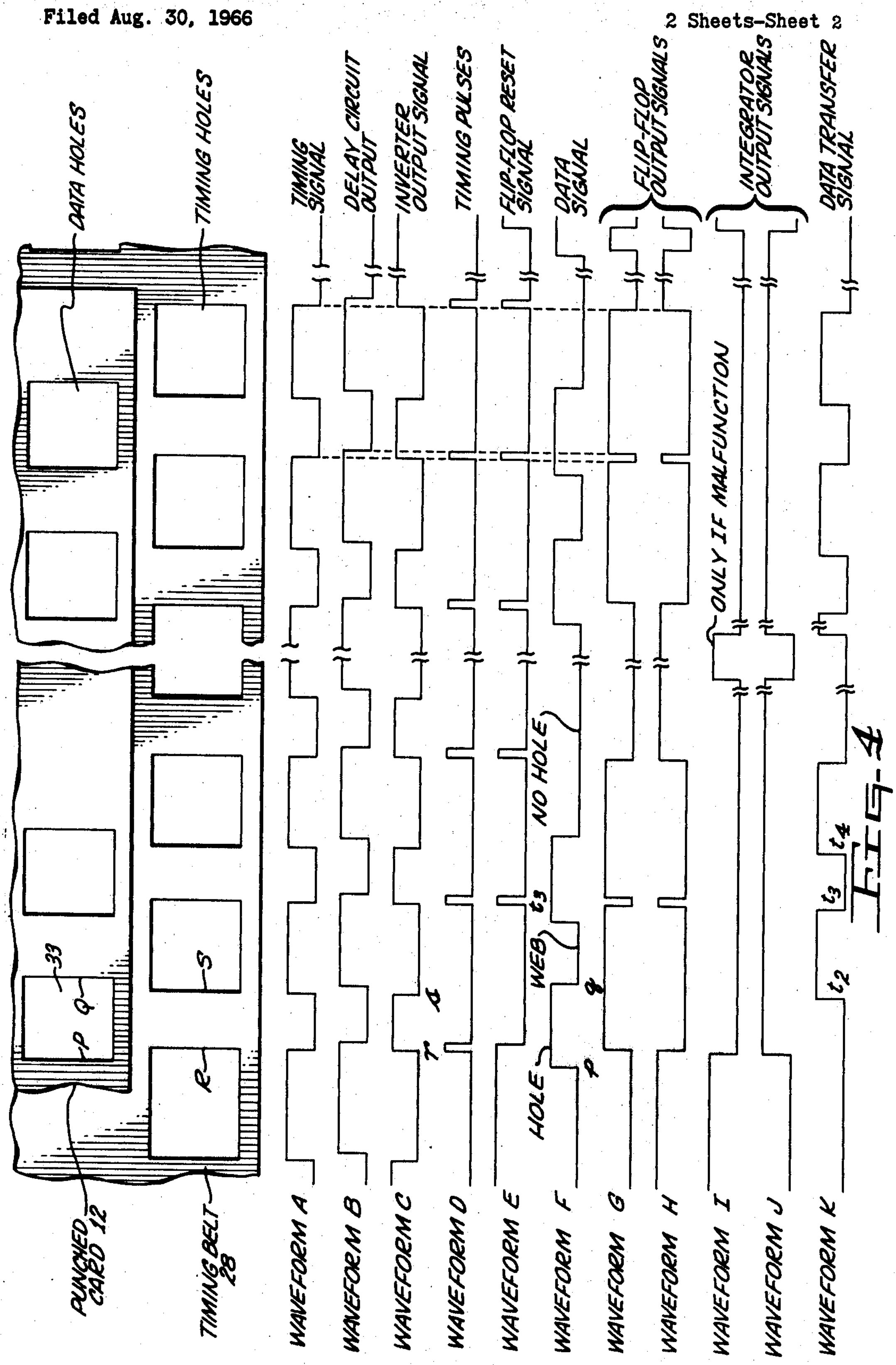
FIG. 4 is a timing chart of the waveforms useful in explaining the operation of the present invention.

The operation of the synchronized timing and information extension features of this invention may be more clearly seen by reference to the timing chart shown in FIG. 4.

The upper portion of FIG. 4 illustrates the relative positions of the timing holes and the data holes as they pass the reading station 20 of the card reader.

Waveform A illustrates diagrammatically the timing signals generated by timing photocell 32 as the timing belt moves past the reading station 20.

Waveform B illustrates graphically the output signal of the delay circuit 52.

Waveform C illustrates graphically the output signal of inverter 44.

Waveform D illustrates graphically the timing pulses at the output of AND-gate 47.

Waveform E illustrates graphically the output signal of OR-gate 53.

Waveform F illustrates graphically the output signal of the photocell 38 upon reading the card information illustrated by the data holes at the upper portion of FIG. 4.

Waveforms G and H illustrate graphically the output signals of the 1 and 0 output terminals, respectively, of the flip-flop 42.

Waveform I illustrates the output signal of integrator 54.

Waveform J illustrates the inverted integrator output signal of inverter 46.

Waveform K illustrates the data transfer signal at the output terminal of AND-gate 50.

While the principles of the invention have now been made clear in an illustrative embodiment, there will be immediately obvious to those skilled in the art many modifications of structure, arrangement, proportions, the elements, materials, and components, used in the practice of the invention, and otherwise, which are particularly adapted for specific environments and operating requirements without departing from those principles. The appended claims are therefore intended to cover and embrace any such modifications, within the limits only of the true spirit and scope of the invention.

What is claimed is:

1. In a system for reading punched cards having holes at a plurality of predetermined locations thereon wherein sensing means are provided for sensing the presence of holes in a card during movement of the card past said sensing means and for delivering a data signal, said data signal having a first value when said sensing means is opposite a hole and a second value when said sensing means is not opposite a hole, and wherein a timing means generates a timing signal having a frequency determined by the speed of movement of the card being read, said timing signal having alternating first and second values, the combination comprising: a storage means; gating means coupled to receive said data signal and said timing signal and effective upon the concurrence of said first value of said data signal and said second value of said timing signal for controlling said storage means to cause it to assume a first state; pulse generating means for developing a timing pulse when said timing signal changes from said first value to said second value, said pulse generating means being coupled to said timing means and to said storage means, said timing pulse causing said storage means to assume a second state, said storage means delivering output signals corresponding to its storage condition; an integrator, said integrator being coupled to said pulse generating means, said integrator providing an integrator output signal, said integrator output signal having a first value when the speed of movement of the card being read is less than a predetermined value and having a second value when the speed of movement of the card is greater than said predetermined value; means for coupling said integrator to said storage means, said first value of said integrator output signal causing said storage means to assume a second state; and a second gating means coupled to said integrator and to said timing means and effective upon the concurrence of said first value of said timing signal and said second value of said integrator output signal for developing a data transfer signal.

2. In a system for reading punched cards having holes at a plurality of predetermined locations thereon, wherein sensing means are provided for sensing the presence of holes in a card during movement of the card past the sensing means and for delivering the data signal, said data signal having a first value when the sensing means is opposite a hole and a second value when the sensing means is not opposite a hole, and wherein a movable belt having a plurality of holes is moved past a sensing station by a moving card, said station developing a timing signal having a frequency determined by the speed of movement of the belt, said timing signal having alternating first and second values, the combination comprising: a storage means having two stable states; gating means coupled to said station and to said sensing means and effective upon the concurrence of said first value of said data signal and said second value of said timing signal for controlling said storage means to cause it to assume a first state; pulse generating means for developing a timing pulse when said timing signal changes from said first value to said second value, said pulse generating means being coupled to said station and to said storage means, said timing pulse causing said storage means to assume a second state, said storage means delivering output signals corresponding to its storage condition; an integrator, said integrator being coupled to said pulse generating means, said integrator providing an integrator output signal, said integrator output signal having a first value when the speed of movement of the belt is less than a predetermined value and having a second value when the speed of movement of the belt is greater than said predetermined value; and means for coupling said integrator to said storage means, said first value of said integrator output signal causing said storage means to assume a second state.

3. The combination as defined in claim 2 including: integrator output signal, said integrator output signal having a first value when the speed of movement of the belt is less than a predetermined value and having a second value when the speed of movement of the belt is greater than said predetermined value; a second gating means coupled to said integrator and to said station and effective upon the concurrence of said first value of said timing signal and said second value of said integrator output signal for developing a data transfer signal.

4. In a system for reading punched cards having holes at a plurality of predetermined locations thereon, wherein sensing means are provided for sensing the presence of holes in a card during movement of the card past the sensing means and for delivering the data signal, said data signal having a first value when the sensing means is opposite a hole and a second value when the sensing means is not opposite a hole, and wherein a movable belt having a plurality of holes is moved past a sensing station by a moving card, said station developing a timing signal having a frequency determined by the speed of movement of the belt, said timing signal having alternating first and second values, the combination comprising: a storage means having two stable states; gating means coupled to said station and to said sensing means and effective upon the concurrence of said first value of said data signal and said second value of said timing signal for controlling said storage means to cause it to assume a first state; pulse generating means for developing a timing pulse when said timing signal changes from said first value to said second value, said pulse generating means being coupled to said station and to said storage means, said timing pulse causing said storage means to assume a second state, said storage means delivering output signals corresponding to its storage condition; an integrator, said integrator being coupled to said pulse generating means, said integrator providing an integrator output signal, said integrator output signal having a first value when the speed of movement of the belt is less than a predetermined value and having a second value when the speed of movement of the belt is greater than said predetermined value; and a second gating means coupled to said integrator and to said station and effective upon the concurrence of said first value of said timing signal and said second value of said integrator output signal for developing a data transfer signal.

5. In a system for reading punched cards having holes at a plurality of locations thereon, wherein sensing means are provided for sensing the presence of holes in a card during movement of the card past the sensing means and for delivering a data signal, said data signal having a first value when the sensing means is opposite a hole and a second value when the sensing means is not opposite a hole, wherein a movable belt having a plurality of holes is moved past a sensing station by a moving card, said station developing a timing signal having a frequency determined by the speed of movement of the belt, said timing signal having alternate first and second values, and wherein means are provided for developing a clutch signal each time an attempt is made to feed a card past said station, the combination comprising: a storage means having two stable states; a first gating means coupled to said station and to said sensing means and effective upon the concurrence of said first value of said data signal and said second value of said timing signal for controlling said storage means to cause it to assume a first state; pulse generating means for developing a timing pulse when said timing signal changes from said first value to said second value, said pulse generating means being coupled to said station and to said storage means, said timing pulse causing said storage means to assume a second state, said storage means delivering output signals corresponding to its storage condition; and integrator, said integrator being coupled to said pulse generating means, said integrator providing an integrator output signal, said integrator output signal having a first value when the speed of movement of the belt is less than a predetermined value and having a second value when the speed of movement of the belt is greater than said predetermined value; and a third gating means coupled to receive said clutch signal and said integrator output signal and effective upon the concurrence of said clutch signal and said first value of said integrator output signal for providing a card misfeed signal.

6. The combination as defined in claim 5 including: means for coupling said integrator to said storage means, said first value of said integrator output signal causing said storage means to assume a second state.

7. The combination as defined in claim 5 including: a second gating means coupled to said integrator and to said station and effective upon the concurrence of said first value of said timing signal and said second value of said integrator output signal for developing a data transfer signal.

8. The combination as defined in claim 5 including: a second gating means coupled to said integrator and to said station and effective upon the concurrence of said first value of said timing signal and said second value of said integrator output signal for developing a data transfer signal; and means for coupling said integrator to said storage means, said first value of said integrator output signal causing said storage means to assume a second state.

9. In a system for reading punched cards having holes at a plurality of locations in a plurality of rows thereon, wherein a plurality of sensing means are provided, each of said means sensing the presence of holes in a corresponding row of the card and delivering a data signal, said data signal having a first value when said sensing means is opposite a hole and a second value when said sensing means is not opposite a hole, each of said sensing means also being responsive to the absence of a card for producing a first value of said data signal, and wherein a movable belt having a plurality of holes is moved past a sensing station by a moving card, said station developing a timing signal having a frequency determined by the speed of movement of the belt, said timing signal having alternate first and second values, the combination comprising: a plurality of bistable storage means; a plurality of gating means, each of said gating means being connected between one of said sensing means and a corresponding one of said storage means, each of said gating means being coupled to said sensing station and effective upon the concurrence of said first value of said data signal and said second value of said timing signal for controlling a corresponding one of said storage means to cause it to assume a first state; pulse generating means for developing a timing pulse when said timing signal changes from said first value to said second value, said pulse generating means being coupled to said station and to each of said storage means, said timing pulse causing each of said storage means to assume a second state, each of said storage means delivering output signals corresponding to its storage condition; an integrator, said integrator being coupled to said pulse generating means, said integrator providing an integrator output signal, said integrator output signal having a first value when the speed of movement of the belt is less than a predetermined value and having a second value when the speed of movement of the belt is greater than said predetermined value; means for coupling said integrator to each of said storage means, said first value of said integrator output signal causing each of said storage means to assume a second state; and OR-gating means having a plurality of input leads and an output lead, each of said input leads being connected to a corresponding one of said storage means, said OR-gating means providing a positive output signal when any of said storage means assumes a second state.

10. The combination as defined in claim 9 including: a monostable multivibrator, said monostable multivibrator having a set input terminal and a trigger terminal, said set input terminal being connected to said output lead of said OR-gating means, said trigger input terminal being connected to said integrator, said monostable multivibrator providing an output signal when said OR-gating means provides a positive output signal to said set input terminal and said integrator output signal changes from said second value to said first value.

References Cited

UNITED STATES PATENTS

| | | | |
|---|---|---|---|
| 3,067,934 | 11/1962 | Amacher et al. | 235—61.115 |
| 3,208,041 | 9/1965 | Swenson | 178—17 XR |
| 3,238,357 | 3/1966 | Minka | 235—61.11 |
| 3,305,670 | 2/1967 | Thomas | 235—61.11 |

DARYL W. COOK, Primary Examiner

R. M. KILGORE, Assistant Examiner

U.S. Cl. X.R.

250—219